United States Patent
Channabasappa

(10) Patent No.: US 8,792,348 B1
(45) Date of Patent: Jul. 29, 2014

(54) SERIAL LINK INTERFACE POWER CONTROL METHOD AND APPARATUS WITH SELECTIVE IDLE DATA DISCARD

(75) Inventor: Shankar Channabasappa, San Jose, CA (US)

(73) Assignee: Netlogic Microsystems, Inc., Irvine, CA (US)

( * ) Notice: Subject to any disclaimer, the term of this patent is extended or adjusted under 35 U.S.C. 154(b) by 513 days.

(21) Appl. No.: 13/034,570

(22) Filed: Feb. 24, 2011

(51) Int. Cl.
H04L 1/00 (2006.01)
H04L 12/26 (2006.01)

(52) U.S. Cl.
CPC ................................ *H04L 43/0811* (2013.01)
USPC .......................................................... 370/235

(58) Field of Classification Search
CPC .................................................. H04L 43/0811
USPC .......................................................... 370/235
See application file for complete search history.

(56) References Cited

U.S. PATENT DOCUMENTS

| 6,151,307 | A | * | 11/2000 | Gauthier et al. | 370/248 |
| 6,324,087 | B1 | | 11/2001 | Pereira | 365/49 |
| 6,763,425 | B1 | | 7/2004 | Pereira | 711/108 |
| 7,243,177 | B1 | * | 7/2007 | Davis et al. | 710/106 |
| 7,346,000 | B1 | | 3/2008 | Srinivasan et al. | 370/235 |
| 8,031,503 | B1 | | 10/2011 | Gyllenhammer et al. | 365/49.18 |
| 8,413,006 | B1 | * | 4/2013 | Mok et al. | 714/752 |
| 2003/0196132 | A1 | * | 10/2003 | Chiang | 713/503 |

* cited by examiner

*Primary Examiner* — Wanda Z Russell
(74) *Attorney, Agent, or Firm* — Sterne, Kessler, Goldstein & Fox PLLC

(57) ABSTRACT

A receiver circuit for coupling to a serial link is disclosed. The receiver circuit comprises a data buffer and serial interface circuitry. The serial interface circuitry receives serialized packet words and processes the serial words for input to the data buffer. The serial interface circuitry includes word detection logic to detect predefined control words and discard logic to selectively inhibit forwarding of one or more of the predefined control words to the data buffer.

18 Claims, 3 Drawing Sheets

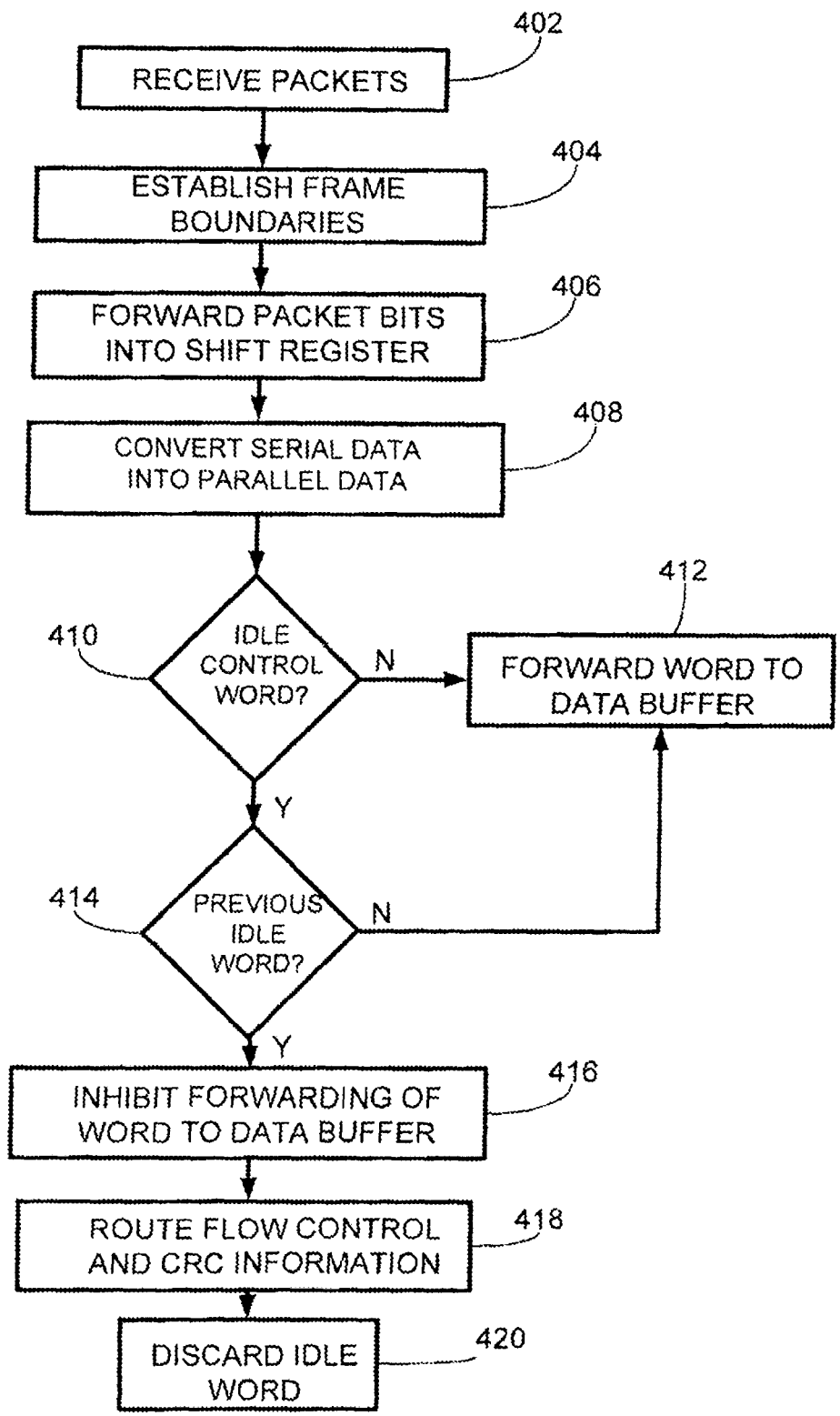

SERIAL LINK INTERFACE POWER CONTROL METHOD AND APPARATUS WITH SELECTIVE IDLE DATA DISCARD

TECHNICAL FIELD

This disclosure relates generally to serial link interfaces, and more particularly to methods and associated apparatus for controlling power usage in a serial link interface through selective idle data discard operations.

BACKGROUND OF RELATED ART

Serial interfaces play an important role in high-speed chip-to-chip signaling. By transferring serialized data along a serial data path, or link, chip pin counts may be minimized while increasing data rates between the chips. While numerous serial protocols exist to enable transmission and receipt of high-speed packet data, very few adequately address power issues that may arise during data reception.

For example, many protocols employ data encoding algorithms to ensure a minimum edge transition density for the serial data stream. This is often provided to ensure that the receiver circuitry maintains a locked condition in terms of timing for proper data reception. During intervals of little to no real data transmission, "idle" control packets are often inserted into the packet stream and sent to satisfy the edge transition density requirements.

Internal to the receiver, as the packets are received, the real data words and the idle control words are often processed with the same circuitry. Although the idle control words may have some value if carrying error correction and flow control information, generally speaking, idle words have little-to-no "data" value. Unfortunately, since the same circuitry processes the data and idle words in the receiver, significant power consumption may occur during extended periods of real data inactivity (during peak idle packet activity).

Thus, the need exists for a serial data method and apparatus that minimizes power consumption for a serial link while still providing signal locking capabilities at the receiver.

BRIEF DESCRIPTION OF THE DRAWINGS

The present embodiments are illustrated by way of example and are not intended to be limited by the figures of the accompanying drawings, where:

FIG. 4 illustrates a flowchart with steps defining a method of receiving serial streams of data and control words.

Like reference numerals refer to corresponding parts throughout the drawing figures.

DETAILED DESCRIPTION

Figure 1:
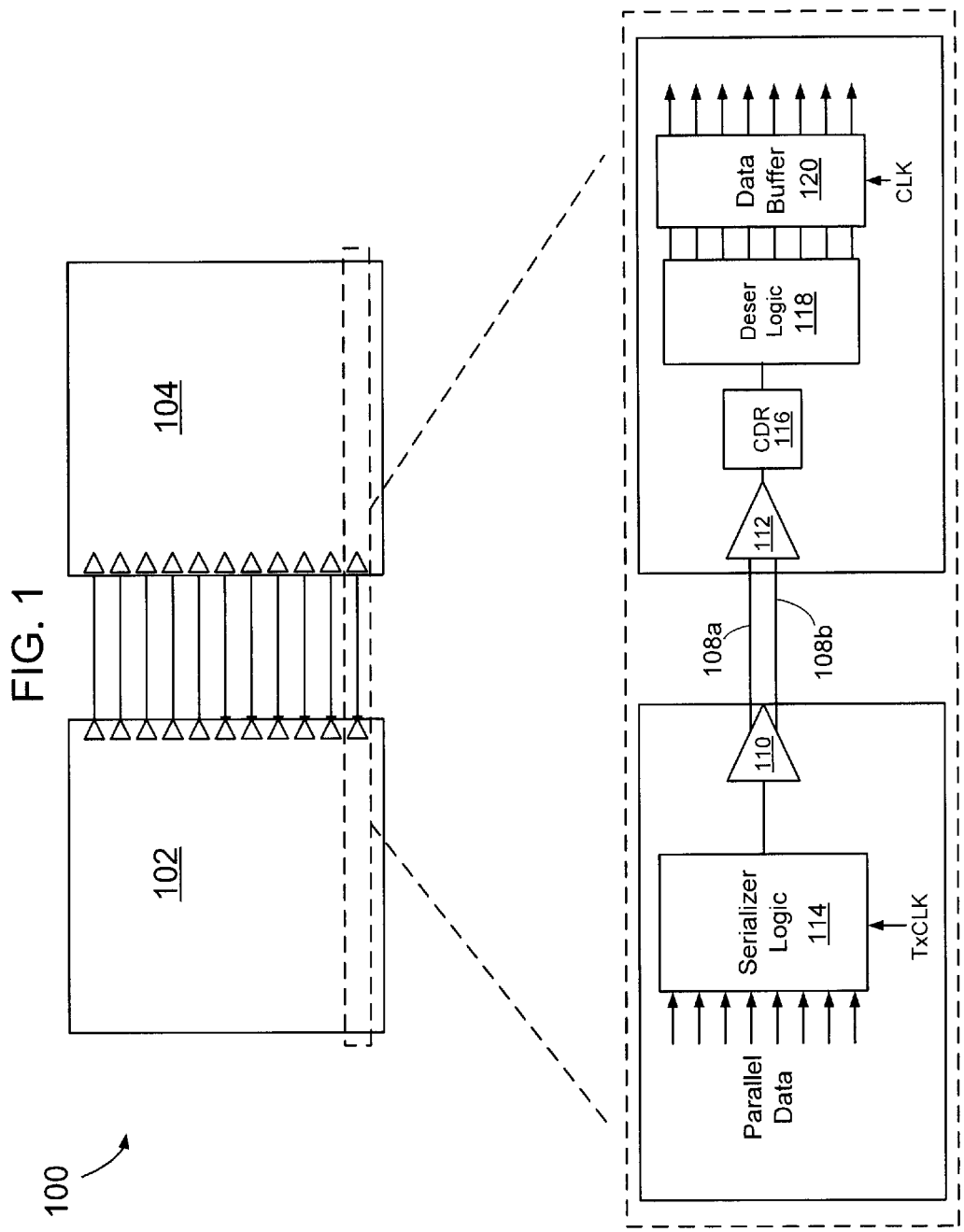
FIG. 1 illustrates a pair of integrated circuit chips interconnected by a plurality of serial links, and a detail close-up of an exemplary channel in accordance with the disclosure herein.

In the following description, numerous specific details are set forth such as examples of specific components, circuits, and processes to provide a thorough understanding of the present embodiments. In the following description, for purposes of explanation, specific nomenclature is set forth to provide a thorough understanding of the present embodiments. However, it will be apparent to one skilled in the art that these specific details may not be required to practice present embodiments. In other instances, well-known circuits and devices are shown in block diagram form to avoid obscuring the present embodiments unnecessarily. It should be noted that the steps and operation discussed herein (e.g., the loading of registers) can be performed either synchronously or asynchronously. The term "coupled" as used herein means connected directly to or connected through one or more intervening components or circuits. Any of the signals provided over various buses described herein may be time multiplexed with other signals and provided over one or more common buses. Additionally, the interconnection between circuit elements or blocks may be shown as buses or as single signal lines. Each of the buses may alternatively be a single signal line, and each of the single signal lines may alternatively be buses. Further, the prefix symbol "/" or the suffix "B" attached to signal names indicates that the signal is an active low signal. Each of the active low signals may be changed to active high signals as generally known in the art.

A receiver circuit is disclosed for coupling to a serial link. The receiver circuit comprises a data buffer and serial interface circuitry. The serial interface circuitry receives serialized packet words and processes the serial words for input to the data buffer. The serial interface circuitry includes word detection logic to detect predefined control words and discard logic to selectively inhibit forwarding of one or more of the predefined control words to the data buffer. By selectively inhibiting forwarding of the predefined control words, power that would otherwise be expended in processing the predefined control words can be saved.

In one embodiment, a method is disclosed that includes receiving serial packet words; converting the serial packet words to parallel words; detecting predefined control words from among the parallel words, and selectively inhibiting forwarding of the detected predefined control words to data processing circuitry.

In a further embodiment, a system is disclosed that includes a first electronic device having a transmitter for transmitting serial data in accordance with a serial protocol. A serial link is coupled to the first electronic device and a second electronic device to route the serial data between the two devices. The second electronic device includes a receiver circuit coupled to the serial link to receive the serial data. The receive circuit includes a data buffer and serial interface circuitry. The serial interface circuitry receives serialized data in the form of packet words and processes the packet words for input to the data buffer. The serial interface circuitry includes word detection logic to detect predefined control words, and gating logic to selectively inhibit forwarding of one or more of the predefined control words to the data buffer.

FIG. 1 shows a high-level chip-to-chip architecture 100 that employs a plurality of serial links 106 or lanes between respective first and second integrated circuit (IC) devices 102 and 104. For purposes of clarity, the IC devices are described herein as IC chips, but may also include any type of electronic device employing a serial interface. Each lane includes a differential pair of conductors 108a and 108b for propagating differential signals or symbols. The paths may be implemented on printed circuit board substrates, such as FR4, backplanes, or via suitable cables. Each link is bounded by respective transmitter and receiver link partners 110 and 112.

In one embodiment, an Interlaken serial protocol ("Interlaken") is employed for communicating data and control information between the link partners 110 and 112. Interlaken enables the use of a configurable number of lanes to establish a desired overall data rate between the chips, and provides a correspondingly scalable serial interface. Interlaken's data transmission format involves segmenting the data into bursts to generate data words. Control words that have a similar packet structure to the data words are inserted at the beginning and end of each data burst, and sub-fields within the control words may affect either the data following or preceding them. Segmenting bursts enables the interface to, if desired, interleave data transmissions from different channels or links to minimize latency. Although the examples described herein focus on use of the Interlaken protocol, many other serial protocols provide similar data and control word structures and may benefit from application of the methods and apparatus described herein.

Referring now to the close-up detail of FIG. 1, which illustrates one channel from a plurality of signal channels, each lane 106 may include serializer logic 114 to receive one or more parallel data words and convert the words to a serial data stream for transmission by the transmitter link partner 110. The data conversion from parallel to serial form in the serializer logic may also involve various encodings, such as embedding of a clock signal for later recovery at the receiver, generating an error correction code (such as a cyclic redundancy code, or CRC), and encoding the data and control bits into a 64B/67B format (Interlaken-specific) to achieve a guaranteed edge transition density. While the plural lanes are illustrated as unidirectional links for simplex data transmission, this is merely for purposes of clarity. Bidirectional links that provide duplex data transmission and reception functionality may also be employed as is well-known in the art.

Further referring to FIG. 1, at the receiver end of the link 106, the serial packets are received by a receiver circuit 112 and may undergo decoding by various circuits to, for example, recover embedded timing information with a clock and data recovery circuit (CDR) 116. The received data may also be evaluated in an error detection and correction process by an ECC decoder (not shown) that generally involves calculating a checksum from a portion of the received encoded data bits, and confirming that the received data has no errors.

Following extraction of the timing information by the CDR circuit 116, the serial data stream is fed to deserializer logic 118, where a serial-to-parallel conversion process is performed. An idle word detection and selective discard method is also carried out, and described in more detail below. The deserializer logic, in general, converts the received packet words into parallel data words that may then be selectively loaded into a buffer circuit 120 for temporary storage before being forwarded to downstream processing circuitry.

Figure 2:
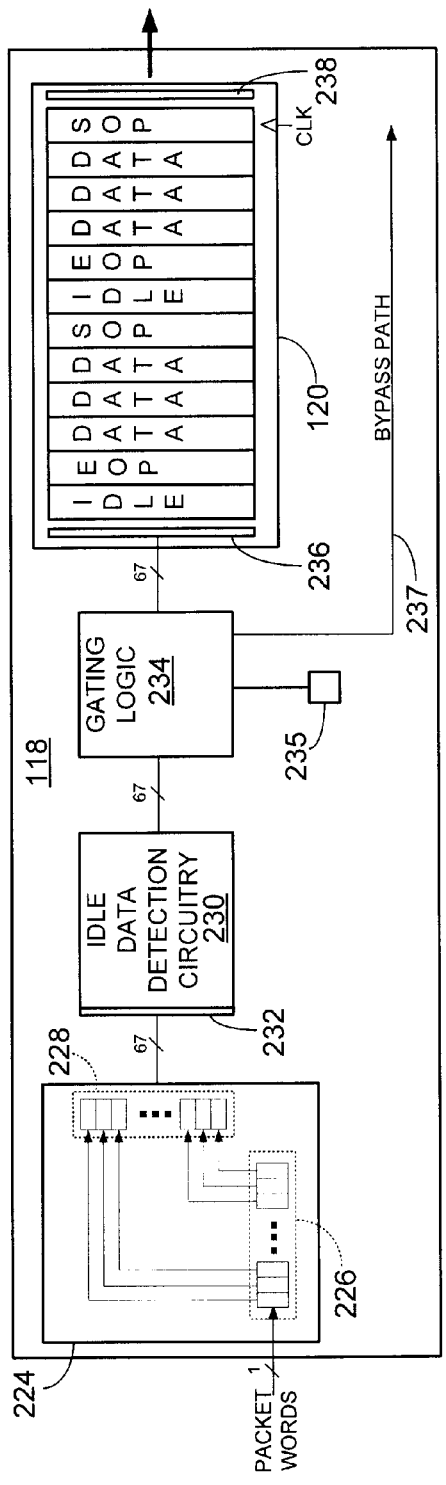
FIG. 2 illustrates logic disposed at each receiver of FIG. 1 to process a received serial stream of data and control words.

FIG. 2 illustrates the deserializer logic 118 in further detail, including a serial-parallel shift register 224, idle data detection circuitry 230 and idle word gating logic 234. The shift register 224 comprises a 1-bit wide and 67-bit deep input interface 226 for loading each received packet word, and then shifts the bits out along a 67-bit wide and 1-bit deep output interface 228 to generate a parallel data word. The idle data detection circuitry includes an input 232 that evaluates the states of several of the control word bits to determine whether the packet word is a data word, or a control word. A further determination of the type of control word is also carried out in order to identify idle control words. The gating logic 234 also tracks previously received idle control words, such as from a 1-bit storage cell 235 ("1" indicating an idle word was most recent word), and compares current idle words to previously received word types to selectively inhibit passage of idle control words to the data buffer 120, as described in further detail below. A bypass path 237 is provided for routing information associated with inhibited or discarded idle words, such as flow control information and/or CRC information.

Further referring to FIG. 2, the data buffer 120 preferably includes a first-in-first-out (FIFO) circuit that provides a write data interface 236 to sequentially load parallel data words in response to a system clock signal, and a read data interface 238 to read out the oldest data words for further processing. The overall function of the data buffer includes, among other things, temporarily storing the received data words as a queue for further downstream data processing circuitry. The size of the data buffer may be based on several criteria, including the level of expected data traffic, the available area on-chip, the speed of the chip core, and other similar factors.

For the Interlaken protocol example, data words loaded into the FIFO 120 are bounded at each end by respective "Start-of-Packet" (SOP) and "End-of-packet" (EOP) control words. This is shown in the data buffer 120 of FIG. 2 by noting the contents of the first four FIFO locations—"SOP", "DATA", "DATA", "DATA", and "EOP." Essentially, the EOP and SOP control words are idle control words that provide a boundary between adjacent data bursts. Additional idle control words, however, provide little-to-no data value and may undesirably cause an increase in power consumption as the write circuitry in the FIFO loads idle words into the FIFO, and the FIFO read circuitry transfers the idle words out of the FIFO. By minimizing idle word propagation through the receiver circuit, and more specifically by gating or selectively discarding idle data words based on predetermined criteria, significant power savings associated with the data FIFO may be achieved. Further, while the disclosure herein presents an example of power savings associated with a data buffer, it should be understood that the power savings may result from inhibiting the idle packets from being processed by any data processing circuitry at the receive side of the link.

Figure 3:
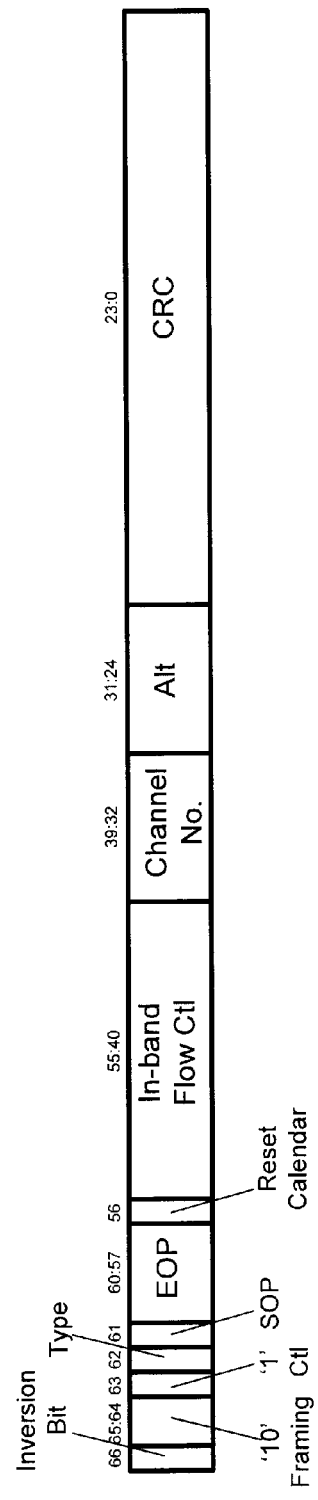
FIG. 3 illustrates a control word data structure in accordance with the Interlaken serial protocol.

Referring now to FIG. 3, a packet structure for a control word in accordance with the Interlaken protocol is shown. Each control word includes 67 bits, with bits [23:0] used to generate a CRC checksum for error detection and correction purposes. The next field of bits, [31:24], provides an optional use field for purposes such as extra flow control information to the receiver. Bits [39:32] indicate the channel number associated with the data burst following this control word. In the event that the control word is an idle control word, all of the bits are set to "0". A reset calendar is provided for bit [56]. To determine whether the control word is an "end-of-packet" (EOP) control word, bits [60:57] are encoded to identify the number of valid bits preceding the control word, and an indicator that the word is, in fact, an EOP control word. Bit [61] provides an indicator to whether the control word is a "start-of-packet" control word. A word type indicator is provided with bit [62], where a "0" indicates an idle control word, and a "1" indicates that the control word is an SOP word, with data following. Bit [63] also confirms whether the control word is an idle control word ("1") or a framing layer control word ("0"). Framing bits [65:64] provide a mechanism to distinguish control and data words, where a "01" indicates data, and a "10" indicates control. Bit [66] is used to indicate whether bits [63:0] have been inverted.

While FIG. 3 depicts a control word packet structure, data words also have a 67 bit packet structure similar to the control words, but with bits [7:0], [15:8], [23:16], [31:24], [39:32], [47:40], [55:48], and [63:56] partitioned into respective byte-sized data groups representing real data bytes. Each data word also includes framing bits [66:64] similar to the control words.

In operation, the receiver circuit carries out steps in accordance with a method, generally designated 400, and shown by the flowchart of FIG. 4. As data packets are received, at step 402, frame boundaries are established by the CDR circuitry, at step 404, and the respective packet bits forwarded into the serial-to-parallel shift register circuit, at step 406. Each serial data word is then converted to a 67-bit parallel data word, at step 408. The idle word detection logic then receives the parallel data word and evaluates bits [57:65] to determine the word type, at step 410, in accordance with Table 1 below:

TABLE 1

| Bit Position | Value | Detected Result |
|---|---|---|
| 65:64 | 01 | data word |
| 65:64 | 10 | control word |
| 63 | 1 | idle/burst control word |
| 63 | 0 | framing control word |
| 62 | 1 | SOP control word |
| 62 | 0 | idle control word |
| 61 | 1 | SOP control word |
| 61 | 0 | EOP control word |
| 60:57 | 1xxx | EOP control word |
| 60:57 | 0000 | idle control word |

If the detected control word is not an idle word, then the word is forwarded to the data buffer, at 412. If an idle control word is detected, at step 410, the gating logic then looks to the prior history of one or more received control words, at step 414. If the most recent control word was an idle word, then the logic selectively inhibits forwarding of the idle word to the data buffer, at 416. If the most recent control word was something other than an idle word, then an EOP or SOP control word has been detected, and the word is forwarded to the buffer, at 412.

More generally, the determination of whether to inhibit the idle control word may be based on predetermined criteria associated with the history, and not necessarily the most recent value. For example, in some situations, it may be desirable to omit any back-to-back idle control words to save power in the data FIFO. By reviewing whether the most recent control word was an idle control word, a newly received idle control word will be inhibited from passing to the data FIFO. In other circumstances, a small number of idle control words may be beneficial in maintaining a degree of separateness between adjacent data words.

Further referring to FIG. 4, in the event that idle control words are detected and inhibited from being passed to the data buffer 120, at step 416, the CRC checksum value and flow control information may be extracted and passed to downstream circuitry via the bypass path for further processing, at step 418, and the idle information itself discarded, at step 420. The checksum value confirms the validity of the idle control word identity, while the flow control information provides an indication of channel traffic conditions.

Those skilled in the art will appreciate the many benefits and advantages afforded by the embodiments described herein. For example, by selectively discarding idle control words before writing the words to a data buffer, power consumption resulting from the idle word processing may be avoided. For periods of peak idle word activity, the selective discard operations may significantly reduce power consumption at the receiver circuit.

In the foregoing specification, the present embodiments have been described with reference to specific exemplary embodiments thereof. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense.

What is claimed is:

1. A receiver circuit for coupling to a serial link, the receiver circuit comprising:
a data buffer;
serial interface circuitry configured to receive serial packet words and process the serial packet words for input to the data buffer, the serial interface circuitry including word detection logic configured to detect control words and data words, and
gating logic configured to:
process the control words and the data words, wherein the control words are forwarded to the data buffer based on a previously detected control word, and
selectively inhibit forwarding the data words to the data buffer.

2. The receiver circuit of claim 1, wherein the serial interface circuitry receives the serial packet words in accordance with an Interlaken packet protocol.

3. The receiver circuit of claim 1, wherein the serial interface circuitry further includes a bypass path to route information associated with the control words.

4. The receiver circuit of claim 3, wherein the information routed on the bypass path includes flow control information.

5. The receiver circuit of claim 3, wherein the information routed on the bypass path comprises CRC information.

6. The receiver circuit of claim 3, wherein the control words comprise idle control words.

7. The receiver circuit of claim 1, wherein the data buffer comprises a first-in-first-out (FIFO) circuit.

8. A method comprising:
receiving serial packet words;
converting the serial packet words to parallel words;
detecting control words and data words from among the parallel words;
processing the control words and the data words, wherein the control words are forwarded to data processing circuitry based on a previously detected control word, and
selectively inhibiting forwarding the data words to the data processing circuitry.

9. The method of claim 8, wherein the control words comprise idle control words.

10. The method of claim 8, wherein processing the control words is based on whether the previously detected control word was an idle control word.

11. The method of claim 8, further including extracting flow control information from the control words.

12. The method of claim 8, farther including extracting CRC information from the control words.

13. A system comprising:
a first electronic device having a transmitter for transmitting serial data in accordance with a serial protocol;
a serial link having one end coupled to the first electronic device to route the serial data; and
a second electronic device having a receiver circuit coupled to a second end of the serial link to receive the serial data, the receiver circuit including:
a data buffer;
serial interface circuitry configured to receive the serial data as packet words and process the packet words for input to the data buffer, the serial interface circuitry including word detection logic configured to detect control words and data words, and
gating logic configured to:
process the control words and the data words, wherein the control words are forwarded to the data buffer based on a previously detected control word, and selectively inhibit forwarding the data words to the data buffer.

14. The system of claim 13, further comprising a plurality of serial links disposed between the first and second electronic devices.

15. The system of claim 13, wherein the serial protocol comprises an Interlaken protocol.

16. The system of claim 13, further including a bypass path to route information associated with the control words.

17. The system of claim 16, wherein the information routed on the bypass path comprises flow control information.

18. The system of claim 16, wherein the information routed on the bypass path comprises CRC information.

* * * * *

UNITED STATES PATENT AND TRADEMARK OFFICE
CERTIFICATE OF CORRECTION

PATENT NO. : 8,792,348 B1
APPLICATION NO. : 13/034570
DATED : July 29, 2014
INVENTOR(S) : Shankar Channabasappa Page 1 of 1

It is certified that error appears in the above-identified patent and that said Letters Patent is hereby corrected as shown below:

IN THE CLAIMS:

Column 6, line 48, please replace "farther including" with --further including--.

Signed and Sealed this
Sixth Day of January, 2015

Michelle K. Lee
*Deputy Director of the United States Patent and Trademark Office*